Patented Aug. 17, 1954

2,686,731

UNITED STATES PATENT OFFICE 2,686,731

ULTRAFINE PIGMENTS AND METHODS OF MAKING SAME

Eugene Wainer, Cleveland Heights, Ohio, assignor, by mesne assignments, to Northern Minerals Incorporated, Keeseville, N. Y., a corporation of New York No Drawing. Application September 8, 1949, Serial No. 114,687

19 Claims. (Cl. 106—306)

In white pigments, those particularly for hiding power or covering property, have long been known. More recently, a group of pigments known as extenders or reinforcing pigments has come into prominence for a wide variety of applications. Generally, this kind of pigment is characterized by low bulk density and by particle sizes of one micron and less, down to as low as twenty millimicrons as heretofore known. Such materials have found extensive use in the paint, paper, rubber, plastic, insecticide, and allied industries. The present invention is concerned with a pigment of this class, and in accordance with this invention, pigments may be obtained having particularly small particle sizes, and at attractively low cost of production.

Other objects of this invention will become apparent as the following description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The particular properties on which the function and operation of extender pigments depend are not well understood. It is certain however, that the particle size should be extremely fine, and much smaller than that normally considered optimum for a pigment used to develop hiding power. For example, a hiding power pigment will have a particle size roughly of the same order of the wave length of visible light whereas the particles of the pigments under discussion are generally very much smaller. Generally, it is believed that such pigments owe their utility primarily to the huge surface area which is made available as a result of their small particle size coupled with a shape which is irregular in nature which in turn tends to increase the available surface area. In other words, the effectiveness of these pigments is a physical property, and is usually not the result of their chemical nature. As a matter of fact and for the most part, it is necessary that the pigments be inert chemicals. For example, carbon black which has its major use as a reinforcement pigment for rubber, is of extremely small particle size. In view of its black color however, its use is restricted to those items where lightness of color or whiteness is not required. The addition of carbon black to rubber stock greatly toughens and strengthens the rubber and has a profound effect on the resistance of the rubber stock to wear, markedly increasing the useful life of the article. In the paint industry, extender pigments are used to afford bulk, but in addition their function is to act as a low refractive index reflector for the high hiding power pigments which paints normally contain. Again in this application, it has been found that the finer the particle size of the extender pigment the more effective is its use in improving the properties of paint. Normally the addition of pigments to plastics of all types is not a factor in improving the strength, however, it has again been found that when pigments having particle size in the range of 20 to 50 microns are added to plastics of a variety of types, the strength and wearability of the plastic is markedly increased. This statement with respect to strength, toughness, and wearability applies equally well to such items as paper, paint, plastics, and the like.

The use of white reinforcing pigments is particularly important for rubber or for any item whose color is a factor in sales appeal. For example, white sidewall tires or light colored treads can be made available through use of reinforcing pigments which does not detract from the color of the base material. Thus, it may be said that the prime role of extender or reinforcing pigments is chiefly for the purpose of increasing the strength of such items as paper, paint, plastics, and rubber beyond the limits normally exhibited by the pure compounds and at the same time not detracting from color appeal which may eventually be desired to be added to the product. Secondary purposes are the extender use for adding to the pigmenting strength of the more expensive hiding power pigments. For example, such reinforcing pigments are attractively and economically used in conjunction with the expensive titanium dioxide pigments which are generally used for preparing opaque paint, paper, and plastic films. Use of proper amounts of the white extender pigments in conjunction with titanium dioxide reduces the total quantity of expensive titanium dioxide required for obtaining the necessary opacity, and at the same time increases the durability of the object in question.

The second large field of application for these extremely fine low bulk type pigments is in the field of dry diluents. This field is particularly important in agriculture where expensive materials are sprayed or dusted over large areas of ground. For example, the familiar insecticide DDT if used in 100% concentration becomes much too expensive for large scale distribution on the farm. In addition, the DDT tends to lose its effectiveness quite quickly as a result of being blown away, or washed, or otherwise eroded from the spot where it was initially sprayed. The same kind of problem exists with a variety of materials such as insecticides, agricultural sprays, fertilizers, and the like. Not only does the problem of maximum utility and uniformity of distribution of these materials exist with respect to the sprayed or dusted areas, but the stability of the sprayed product when used in high concentrations is open to question.

A very common practice in these cases is to dilute the item in question with a substantial quantity of an inert powder, and such inert powder must have a number of precise characteristics. It must have a particle size very much finer than the individual particle of the insecticide or agricultural spraying material. It must not react chemically with the agricultural materials. In addition, it must have the property of coating the surface of the particle evenly and entirely. It must not be readily washed off in rain and finally it must be of low cost. By use of such dry diluents, the usefulness and general applicability of such agricultural sprays is greatly increased due primarily to the development of optimum concentration of agricultural spray per unit area, and at the same time improving the unit area dispersion so that all portions of the area to be treated are contacted with the proper amount of spray.

A third large application for these ultra-fine pigments is as a major ingredient in polishing compounds for baked lacquer finishes, particularly of the automotive type. In these cases, the pigment is advantageously dispersed in a mixture of water and a humectant such as glycerol. The polishing action is more of a flowing or healing of scratches rather than direct abrasion.

In the body of the specification presented below, products are described whose particle size range exhibits a substantial portion in sizes of 10 millimicrons (by electron microscope). The highly unique character of such particles in such size ranges is emphasized by the point that 10 millimicrons are equivalent to 100 Angstrom units, which is in the range of molecular size. Thus, the particles themselves will consist of aggregates of at most a few molecules.

While it may be hypotheticated that the function of these ultra-fine pigments is to make available an extremely large surface area, the exact function is not well defined. It is plausible to assume, however, that the action by which these reinforcing pigments make themselves effective is the result of a surface reaction in which physico-chemical bonds are developed between surfaces of the particle and the base material, and that such surface reactions are made possible only because individual molecules rather than large groups of molecules are involved.

I have developed a novel group of pigments which have utility in the application described in the foregoing, and also have developed procedures for preparation of such pigments. By proper choice of conditions, these materials can be made in bulk density as low as ten pounds per cubic foot or less, and in a particle size range of 20 to 50 millimicrons. These pigments are white, substantially neutral when dispersed in water, and are usually inert for the systems which were mentioned in the previous portions of this description. As will be seen hereinafter, all of these pigments can be made at relatively low cost.

Specifically these pigments are a family of materials based on silica which develop novel characteristics primarily as a result of their method of preparation. This family of pigments consists of hydrated silica, combinations of hydrates of magnesium, calcium, strontium, barium, zinc, and aluminum with hydrated silica or combinations of two or more of these hydrates plus hydrated silica. It is especially the physical nature of this material which is novel. The silica derivative of magnesium, calcium, strontium, barium, zinc, and aluminum are believed to be novel both chemically and physically. While the simple derivatives of hydrated silica may be made as hereinafter described, it is also possible to prepare permutations and combinations of these derivatives to develop unusual properties.

Generally speaking, the procedure involved is as follows: natural or synthetic calcium silicate is dissolved in a mineral acid under specific conditions. Under proper conditions of concentration and temperature, a substantially clear solution is obtained. On dilution of such a solution under specified conditions, an easily filterable hydrated silica separates out whose particle size may be varied depending on the condition of precipitation. Derivatives of magnesium, calcium, strontium, barium, zinc, or aluminum or combinations of these materials plus hydrated silica may be prepared by adding in dilute form slurries or solutions of the hydrate of these materials in the dilution step described above. Under certain conditions of concentration and temperature, an easily filterable flocculant white precipitate is obtained immediately. Again the particle size of the product depends on the conditions established. The ratio of precipitating agents in this latter case are between certain molecular limits, and if amounts of precipitants are used above and below these ratios, a pronounced variation in conditions of temperature and concentration is required in order to yield products of utility for the purposes under discussion.

After the products are prepared, they are filtered, washed free of soluble salts, and then dried at a low temperature, preferably through spray drying techniques. Suitable drying temperatures are in the range of 90 to 110° C. The dry product is made ready for use by disintegration in a mechanical mill.

The exact chemical nature of the compound formed is not clear. It appears most suitable, however, to describe the product obtained as an addition complex in which the degree of chemical binding is relatively weak. It is suspected that the function of the weakly alkaline or alkaline addition agent is primarily that of modification of surface characteristics of the silica gel initially formed so that precipitation takes places on dilution in an entirely different particle size range than in its absence. This is borne out by the fact that the straight hydrated silica product is generally somewhat coarser than the products obtained by the addition of the alkaline agents listed in the foregoing. In addition, it is further suspected that this control of particle size develops as the result of adsorption of the alkaline hydrates on the surface of the silicious micelle almost as soon as it is formed, and thus prevents further growth. While it would be of interest to know just what the chemical nature of the precipitate obtained is, the determination of the exact nature is not necessary for the purposes of this description. In the foregoing list of useful derivatives which may be prepared, it is indicated that combinations of precipitants may be used to prepare a complex product. For example, it is possible to prepare a complex of lime and hydrated silica or a complex consisting of a mixture of lime, alumina, and silica or of alumina, magnesia, and silica and so forth. Reason for preparation and use of such complexes will be given below.

In the practice of my invention, I use as the prime starting material a silicate of multivalent element, and a requirement for utility of this multivalent silicate is that it be readily and quickly soluble in mineral acids. The most suitable silicate from the standpoint of availability, utility, and cost is calcium silicate of which four general types are available in very large quantities. These are (1) the mineral wollastonite which consists chiefly of practically pure calcium silicate in about stoichiometrical proportion, (2) diopside which consists of a mixture of calcium and magnesium silicates, (3) slag from electric furnace manufacture of phosphates which consist chiefly of calcium silicate containing about 8% alumina and minor quantities of $P_2O_5$, iron, fluorine, and traces of other materials, (4) blast furnace slag which is quite similar in composition to the phosphate type slag except that it may contain small quantities of iron, manganese, sulphur, and the like. For most usefulness for the purposes of the invention here described, both the phosphate slags and the blast furnace slags must have their iron content reduced as low as possible, and technical products of this description are now available with iron content of less than one per cent. The average analyses of these four classes of materials are given in Table I, and for the purposes of this description they are generically classed as calcium silicates.

TABLE I

*Analysis and HCl equivalent of commercial calcium silicates*

|  | Wollastonite | Diopside | Phosphate Slag No. 1 | Phosphate Slag No. 2 | Blast Furnace Slage |
|---|---|---|---|---|---|
| $SiO_2$ | 49.80 | 54.72 | 38.87 | 40.44 | 35.05 |
| MgO | 1.40 | 25.88 | 0.40 | 0.20 | 3.80 |
| CaO | 46.51 | 12.44 | 46.83 | 47.18 | 45.28 |
| $Al_2O_3$ | 1.50 | 5.80 | 8.70 | 7.62 | 12.40 |
| $Fe_2O_3$ | 0.61 | 0.60 | 0.14 | 0.20 | 0.1 |
| F |  |  | 2.70 | 2.62 |  |
| $P_2O_5$ |  |  | 1.29 | 0.55 |  |
| S |  |  |  |  | 1.80 |
| others | 0.18 | 0.56 | 1.07 | 1.19 | 1.57 |
| Dry HCl Equivalent | 67.11 | 76.52 | 80.61 | 78.53 | 92.74 |
| $SiO_2$/HCl ratio | 74.0 | 71.5 | 48.2 | 51.4 | 38.0 |

Examination of this table indicates that less mineral acid will be required to react completely with the minerals wollastonite and diopside than with the slag products per unit of weight, and on this basis the use of wollastonite is generally recommended. The determining factor is the $SiO_2$:HCl ratio. While the wollastonite is slightly more expensive than a cleaned slag product, it is used except where freight charges develop a signal advantage from a cost standpoint for the slag products in which case the slag is the starting material.

For purposes of this procedure, the calcium silicate product must be ground fine enough to react quickly with the acid as described hereinafter. A particle size of 100 mesh or finer is necessary, that is, particles fine enough so that they will pass through a screen having 100 meshes to the inch. A particle size minus 200 mesh is preferred, that is to say that at a particle size of 100 mesh a reaction of sufficient completeness is obtained for utility, and a factor of safety is made available by further reducing the particle size of the initial reactant to at least 200 mesh.

The calcium silicate is then dissolved in a mixture of water and mineral acid. The mineral acid used is one whose salts of calcium are soluble in water, hydrochloric and nitric being the major acids involved in this description. In view of the relatively high cost of nitric as compared with hydrochloric, hydrochloric acid is the preferred solvent. To carry out the reaction, one mole of calcium silicate or its equivalent is mixed with about (see Table I) two moles of hydrochloric acid in the presence of a determined amount of water.

Two alternative procedures may be used for mixing, whichever is the most convenient. In the first, the water is mixed with the hydrochloric acid and the calcium silicate then added with constant stirring. In the second, the water is mixed with the calcium silicate until the dispersion is complete and the slurry of calcium silicate and water after thorough stirring is then added to the hydrochloric acid. Irrespective of the method of mixing, the procedure is the same in both cases. The dry calcium silicate or the calcium silicate water slurry is added slowly with stirring to the hydrochloric acid solution. The addition may be quite rapid providing the stirring is quite rapid. On mixing the reagents, an immediate bubbling reaction takes place which is due to the decomposition of some calcium carbonate which is usually present in calcium silicate raw materials.

This bubbling will subside in about one minute. Stirring is continued and about three to four minutes thereafter an exothermic reaction takes place with the evolution of a considerable amount of heat sufficient to bring the batch practically to the boiling point of the liquids involved. The calcium silicate goes completely into solution and the end point is determined when the clarity of the mixed batch reaches a maximum. At this point, practically all opacity disappears and the solution is essentially transparent. In order to insure completeness of reaction in all cases, it is advisable to stir for about five minutes past the point of maximum clarity.

After the solution becomes clear and the stirring period is completed, the batch is then diluted with water using a volume about two to two and one-half times the volume of the initial batch. The temperature and conditions used in this solution determines the particle size of the final product obtained. For example, if the dilution is done slowly and with cold water, the particle size tends to be relatively coarse; if the dilution is done rapidly and with hot water, the particle size tends to be relatively fine. Further, whether the dilution is accomplished hot or cold, the time which elapses between the development of clarity as a result of the reaction between acid and calcium silicate, and dilution is an important factor in determining the range of particle size obtained. The less the amount of time allowed to elapse between development of clarity and the initiation of dilution, the smaller the eventual particle size, and conversely, the greater the amount of elapsed time between these two steps, the larger the eventual particle size. For the purposes of this invention, five minutes of elapsed time is about the maximum permissible, and lesser amounts should be used possible. In all cases this dilution must be accompanied with vigorous stirring to prevent the formation of hard aggregates.

In the case of the hydrated silica diluting with cold water and slowly, a product is obtained having a particle size in the range from 100 millimicrons to 1,000 millimicrons. If the dilution is done rapidly and with hot water, a product is obtained having a particle size between 50 millimicrons and 100 millimicrons.

In either case after the dilution is complete, the batch is stirred for about 20 minutes longer after which the light flocculant precipitate is ready for washing. This light flocculant precipitate forms immediately in the dilution procedure. The precipitate may be washed either by decantation or by filtration. It settles quite rapidly and filters freely. It is washed until substantially free of chlorides after which it is dried at a temperature between 90 and 110° C., preferably by spray drying procedures. On drying at these temperatures, the yield figures which develop indicate that the product obtained is in all probability monohydrated silicic acid. If the temperature of drying is between 120 and 150° C., the product which is obtained appears to be anhydrous silica having particle sizes of the same order of magnitude as indicated above. After drying, the product is disintegrated in a pulverizing mill, and is then ready for use.

Modifications in particle size can also be obtained by altering the conditions after precipitation is complete. For example, a lengthy digestion period with stirring will tend to increase the particle size, and this rapidity of increase is somewhat more rapid if the temperature is slightly above room temperature. At temperatures close to the boiling point, changes in particle size are somewhat slower, but there does appear to be effect on the change in shape. In any case in order to obtain products which are most useful from the standpoint of this description the dilution step should be carried out hot and as rapidly as possible, and filtration should take place in twenty to thirty minutes after precipitation is complete.

The inclusion of surface active agents or wetting agents in the dilution step is an effective means for obtaining a more uniform distribution of particle size and also for obtaining a range of particle size somewhat smaller than in the absence of such wetting agents. These, as well known, are on the order of sulphonated alcohols and salts thereof, sulphonated aryl and alkyl compounds, and mixtures, etc. A variety of wetting agents are suitable for this operation identified by such trade names as Aerosol Ot, Alconox, Tergitol, Igipon, and so forth. Also, the nonionic types such as Antarox are quite effective. Apparently the prime effect of these wetting agents is the deflocculation of the system so that each particle is completely separated from its neighbor.

The multivalent derivatives of the hydrated silica are the most important group of materials covered in this description. These are made by adding a hydrate in suspension or solution form in the dilution step. For example, after the calcium silicate has been dissolved in hydrochloric acid, a suspension or solution of an alkaline earth hydrate is added along with the dilution water under specific conditions. In all cases, the particle sizes obtained from these multivalent silicate derivatives are smaller than the hydrated silica itself. Again the conditions of dilution which were described under the hydrated silica section are effective for these types of products. To repeat these conditions are as follows: the more rapid the dilution and the higher the temperature, the finer the particle size; the slower the dilution and the lower the temperature, the coarser the particle size; the sooner the dilution is accomplished after clearing, the finer the particle size; and the more time which elapses between development of clarity and the next step in the reaction, the coarser the particle size. The use of a proper wetting agent in the dilution step is effective in reducing the overall particle size range. Digestion for extended periods after precipitation tends to increase the particle size.

As indicated, the precipitant of the multivalent materials used as addition agents are the hydrates of these multivalent agents or their oxides, these having been found to be most useful for obtaining the proper results. Hydrated lime is the calcium precipitating material, and this is added to the solution in the form of a water suspension. Magnesium hydrate is the precipitant used in the form of a water suspension, and this magnesium hydrate is prepared as a result of a reaction between a solution of magnesium chloride and calcium hydrate, magnesia hydrate being less soluble than the corresponding calcium compound and as a result of this reaction calcium chloride is formed which is washed out by filtration. Barium and strontium hydrate are added in the form of their clear water solutions at temperatures between 80 and 90° C. Zinc oxide hydrated is formed by precipitating a salt of zinc with ammonium hydroxide, filtering and washing it. Care must be used not to use an excess of ammonia in precipitating the zinc hydrate since under these conditions the zinc complex will go into solution. Under some conditions dry zinc oxide may also be used. Alumina hydrate is also obtained by precipitation of an alumina salt with ammonia, filtering and thoroughly washing, and then dispersing in water. In each of the cases where the hydrate is obtained wet as a result of a metathetical or precipitation reaction, the hydrate used as a precipitant is not dried before dispersion in water, that is, the wet cake is ground immediately or otherwise dispersed in the dilution water referred to above.

The generalized details of the method of preparation of these complex compounds will now be described for each case. Discussing first the calcium derivative, the fully hydrated lime of commerce is suitable as a reactant. This hydrated lime is mixed with the dilution water in proper ratio and is then disintegrated in a ball mill to break up all aggregates. If the dilution is done at room temperature, it is found that products in a particle size range from 20 to 50 millimicrons are obtained using a ratio of reactants between three moles of silica and one mole of calcium hydrate to between three moles of silica and two moles of calcium hydrate. The three to two ratio is preferred. On precipitation at room temperature, ratios above and below the amounts just given invariably produce products which are aggregated and considerably coarser than the limits suggested. If the precipitation is carried out at elevated temperatures, the ratios which are suitable for producing products in the size range required will vary between three moles of hydrated silica to two moles of hydrated lime up to three moles of hydrated silica to three moles of hydrated lime, and again in this case, the three to two derivative is preferred. If the precipitation is done at elevated temperature and particularly if carried out in the presence of a wetting agent and immediately after the first reaction clears, the particle size of products finally obtained will be in the range of ten to thirty millimicrons. The yield figures obtained in each case indicate that the formula of the compound is apparently equivalent to a combination of 3 moles of monohydrated silica and 2 moles of monohydrated lime, that is, in the preferred case the composition will be $3H_2SiO_3.2Ca(OH)_2$. If the reaction is carried out at elevated temperatures, the conditions for obtaining the preferred particle size range are not quite so critical as at the lower temperature, that is, a wider range of calcium hydrate may be used for precipitation purposes.

Although the preferred range given above is between two and three moles of calcium hydrate per three moles of silica, lesser quantities of calcium hydrate will still produce a material in a satisfactory particle size range. However, it is in the interest of economy that the amount of lime be increased as much as possible. The properties sought for and which determine the desired conditions are low bulk density and fine particle size.

As an illustrative example:

I. The calcium silicate was reacted with hydrochloric acid as previously described; immediately this reaction was completed, a well dispersed slurry of calcium hydrate in water heated to 90° C. and of slurry volume equal to 2.5 times that of the reaction of acid and calcium silicate was added rapidly and with vigorous stirring to the clear calcium silicate solution. A bulky white precipitate was formed immediately. Stirring was continued for 10 minutes after which the precipitate was filtered and washed free of chloride, dried at 90 to 110° C., pulverized, and packed. If a wetting agent is used, the amounts normally involved are about one tenth of one per cent of the total amount of calcium hydrate slurry, that is, if a thousand grams of slurry of calcium hydrate is used then one gram of wetting agent is involved. Under the best conditions, a hydrated calcium silicate is obtained which is white in color which has a particle size between ten and thirty millimicrons, and which has a bulk density between six and ten pounds per cubic foot.

In the case of the hydrate of magnesia, it appears that the conditions, products, and molar ratios of reactants are equivalent to those developed and used for the lime derivative, and the same range of particle sizes and bulk densities are obtained. The empirical formula of the compound which produces the best results is in accordance with the following: $3H_2SiO_3.2Mg(OH)_2$. The situations in the cases of the barium and strontium hydrate are different than described for the foregoing. In these cases, the barium hydrate, for example, in the form of its octahydrated salt is dissolved in hot water and the precipitant in this case is a clear solution of barium hydrate. In view of the necessity for keeping both the barium and strontium derivatives in solution, these precipitating reactions must be done hot and cannot be carried out at room temperature. The ratios of reactants for obtaining the best results vary between three moles of silica to one to one and one-half moles of barium hydrate, and amounts above or below this ratio yield products of particle sizes in too high a range. The particle size of the product obtained under optimum conditions will be between twenty and forty millimicrons in the case of the barium compound, and between ten and thirty millimicrons in the case of the strontium compound. The bulk density of the barium derivative in the preferred range will be around twelve to fourteen pounds per cubic foot, and the bulk density of the strontium derivative in the preferred range will be between ten and twelve pounds per cubic foot. The yield figures indicate that a compound of the following empirical formula is obtained: $2H_2SiO_3.Ba(OH)_2.H_2O$. A similar derivative is obtained empirically in the case of the strontium compound. In the case of the zinc hydrate derivative, zinc hydrate is made available in the manner indicated in the foregoing. The empirical formula of the preferred compounds vary between three moles of silica and two moles of zinc up to three moles of silica and three moles of zinc, and the products in both cases appear to hold extra water of hydration. For example, in the first case, the empirical formula is as follows: $3H_2SiO_3.2ZnO.2H_2O$ and in the case of the higher content, the empirical formula is as follows: $H_2SiO_3.ZnO.H_2O$. The particle size obtained for the zinc derivative within the ratios given are in the range of ten to fifty millimicrons, and the bulk densities are of the order of eight to ten pounds per cubic foot. Under proper manipulations of condition and particularly in the presence of wetting agents, a particle size range of the order of ten to thirty millimicrons can be obtained. Zinc oxide may be also used as the precipitating agent providing it is first ground in water containing about 10% ammonium hydroxide based on the weight of the zinc oxide used. Grinding under these conditions produces a zinc derivative which is somewhat colloidal in nature, and it appears to be equally effective as a precipitant as the chemically prepared zinc hydrate. As in the case of the lime derivatives, zinc contents above and below the limits given tend to give products considerably coarser than those indicated, though at the higher temperature conditions of precipitation the variation in zinc content may be considerably broader than that indicated for the lime.

In the case of the alumina derivative, the results obtained from yield figures indicate that the optimum compounds formed will vary between these limits $H_2SiO_3.Al(OH)_3.H_2O$ and $3H_2SiO_3.2Al(OH)_3.2H_2O$. In the cases of aluminum hydrate, ratios outside these limits whether done cold or hot invariably produce rather coarse particles, and it is not certain as to whether these coarse particles consist chiefly of hard aggregates or whether they are single crystals. The hard aggregate idea appears to be more certainly the case.

Again as before, the bulk density of the products obtained are in the range of seven to ten pounds per cubic foot, and the particle sizes in the range of ten to fifty millimicrons.

It will be noted that in the foregoing description a range of particle sizes has been given for each product, and a range of bulk densities. Under specific conditions and those conditions which are considered to be optimum, the particle size range is usually considerably narrower, that is, of the order of twenty to thirty millimicrons or at most ten to thirty millimicrons and the bulk density for products of this type are at the lower limits of the ranges given. The important considerations are again as follows: precipitation done rapidly at elevated temperature as soon as possible after the initial decomposition is completed, and filtration and washing completed as soon thereafter as possible. The use of wetting agents in each case is an effective factor in obtaining the proper particle size products.

Complex derivatives of these products can also be made with facility. For example, a mixed calcium magnesium silicate can be prepared simply by using a suitable mixture of calcium and magnesium reactants, and the same is true of the other materials. The aluminum magnesium mixture which consists of two moles of magnesium hydrate and one mole of aluminum hydrate per three moles of silicic acid is particularly interesting from the standpoint of the unctuous feel which is afforded by the product. Thus two or more reactants may be used to produce a combination of products which will have a variation of properties. In addition to this type of precipitation, coprecipitated type products may be considered. For example, an insufficient amount of lime may be used to produce the desired product, and immediately after the addition is complete, one of the other precipitants may be added to complete the reaction such as alumina or magnesia. In these cases, a somewhat coarser particle is obtained, but not to the extent that one would expect in view of the precautions which have been presented previously. For example, a calcium derivative having coprecipitated on it some aluminum silicate will have a particle size in the range of 50 to 100 millimicrons, and a bulk density of the order of fifteen pounds per cubic foot. It is expected that particles in a somewhat coarser range will be most effective as extender pigments for paint, and probably for plastics while the extremely fine material will find its greatest use as a reinforcing pigment from a strength standpoint.

The major portion of this description has emphasized products whose particle size range is of the order of ten to fifty millimicrons. It has been pointed out that if the ratio of reactants or the condition of precipitation vary from the preferred limitations, that particles of higher bulk density and of a coarser particle size range are obtained. Under these conditions, the lower limit of particle size is of the order of fifty millimicrons and may extend as high as 100 to 500 millimicrons. Products having particle sizes in these ranges will not be as effective for reinforcing purposes in view of their reduction of surface area. However, in certain applications they do have use, and these applications are particularly in the field of extenders for paint. Such products may be developed by using ratios of reactants outside of the preferred range or by carrying out the precipitation at as low a temperature as possible, and by making the addition or mixture of reactants at a low rate. Having described my invention, the following examples are indicative of my precise methods of practice.

EXAMPLE II

Wollastonite—200 mesh _____ grams__ 116
HCl, 20° Baumé _____ cc__ 200
Water _____ cc__ 150

(A slight excess was used to permit the reaction to proceed to completion with dispatch.)

The HCl was placed in a 1500 cc. beaker. The ground wollastonite and water were mixed and added as a slurry to the HCl slowly and with stirring, completing the addition in the space of about two minutes. The stirring was continued while the reaction proceeded. A bubbling reaction took place during the addition of the wollastonite to the water which subsided soon after the addition was complete. In two or three minutes thereafter, an exothermic reaction commenced which brought the solution to boiling in one to two minutes, and in about two minutes more the reaction was complete and the solution substantially clear with a decided greenish color. The volume of the solution was now about 400 cc.

This solution was now diluted with 1000 cc. of water heated to about 90° C., taking about thirty seconds to a minute for this operation, and the vigorous stirring during and after the dilution step was continued. The precipitate was filtered and washed thoroughly about ten minutes after dilution was completed. The bulky precipitate was dried at 150° C. and a yield of 64 grams was obtained.

The yield of 82 grams is empirically equivalent to a formula of monohydrated silica while the yield of 64 grams is equivalent to the formula for anhydrous silica.

EXAMPLE III 348 grams of wollastonite, 450 cc. of water, and 600 cc. of 20° Baumé HCl were reacted as in the foregoing example up to the dilution step. At this point, a slurry of 3000 cc. total volume containing 150 grams of calcium hydrate in thoroughly comminuted and dispersed form, said slurry, maintained at 90° C., was added rapidly with stirring to the hot HCl solution, the addition being completed in about three to four minutes. After stirring for 10 minutes longer, the white precipitate was filtered and washed free of chlorides, and then dried at 90° C.

A yield of 395 grams of product was obtained, approximately equivalent to the empirical formula $3H_2SiO_3.2Ca(OH)_2$.

EXAMPLE IV

A slurry of $Mg(OH)_2$ in water was prepared by reaction of $MgCl_2$ and $Ca(OH)_2$ followed by filtration and washing. A dispersion in water was made equivalent to 120 grams of $Mg(OH)_2$ in 3000 cc. of water by grinding the wet and clean filter cake in water.

The procedure is then the same as in Example III and the product yield obtained was 401 grams, approximately equivalent to the empirical formula $3H_2SiO_3.2Mg(OH)_2$.

EXAMPLE V 474 grams of $Ba(OH)_2.8H_2O$ was dissolved in 3000 cc. of water heated to 90° C. The procedure was the same as in Example III and the product yield obtained was 524 grams, approximately equivalent to an empirical formula of $$2H_2SiO_3.Ba(OH)_2.H_2O$$

EXAMPLE VI 400 grams of $Sr(OH)_2.8H_2O$ was dissolved in 3000 cc. of water heated to 90° C. The procedure was then the same as in Example III and the product yield obtained is 470 grams, approximately equivalent to an empirical formula of $2H_2SiO_3.Sr(OH)_2.H_2O$.

EXAMPLE VII 163 grams of pigment grade ZnO was dispersed in 500 cc. water to which are added 50 cc. of $NH_4OH$. The dispersion was ground in a ball mill for 6 hours after which the slurry was diluted with 2500 cc. of water, and then heated to 90° C. The procedure was then the same as in Example III and the product yield obtained was 450 grams, approximately equivalent to the empirical formula $3H_2SiO_3.2ZnO.2H_2O$.

EXAMPLE VIII

Same procedure as in Example VII except that 244 grams ZnO and 75 cc. of $NH_4OH$ were used. The yield was 540 grams, approximately equivalent to an empirical formula of $H_2SiO_3.ZnO.H_2O$.

EXAMPLE IX

The procedure was the same as in Examples VII and VIII except that $Zn(OH)_2$ was prepared as a result of the reaction:

$$ZnCl_2 + 2NH_4OH \rightarrow Zn(OH)_2 + 2NH_4Cl$$

An amount of washed hydrate equivalent to the weights of ZnO given in the preceding examples was dispersed in 3000 cc. of water at 90° C. Thereafter the procedure was the same.

EXAMPLE X 505 grams of $Al_2(SO_4)_3.9H_2O$ was dissolved in 5000 cc. of water, and 430 cc. of $NH_4OH$ of 0.9 sp. gr. was added slowly with vigorous stirring. The flocculant precipitate was washed thoroughly by decantation and filtration, and was then dispersed in a ball mill in 3000 cc. of water. The procedure according to Example III was then followed up to the dilution step at which point the hot (90° C.) $Al(OH)_3$ slurry was added rapidly with stirring to the acid solution of calcium silicate. After the usual treatment, a product yield of 440 grams was obtained, approximately equivalent to the empirical formula $$3H_2SiO_3.2Al(OH)_3.2H_2O$$

EXAMPLE XI

The procedure was the same as in Example X except that 456 grams of $Al_2(SO_4)_3.9H_2O$, 5000 cc. of water, 610 cc. of 0.9 sp. gr. $NH_4OH$ were used. The yield obtained was 520 grams, approximately equivalent to the empirical formula $$H_2SiO_3.Al(OH)_3.H_2O$$

EXAMPLE XII

The procedure in accordance with Examples II through XI was the same except that one gram of wetting agent such as Tergitol 08 was added for each g. of dilution water or slurry. While the yields obtained were of the same order of magnitude, the particle sizes are in a uniformly smaller range.

EXAMPLE XIII

The procedure in accordance with Examples II, III, IV, VII, VIII, IX, X, and XI was the same except that the dilution or slurry addition was accomplished at room temperature and over a period of twenty minutes. The particles obtained were in a coarser range than afforded by the procedures of the preceding examples.

EXAMPLE XIV 700 grams of wollastonite, 900 cc. of water, and 1200 cc. of 20° Baumé HCl were reacted according to the procedure given in Example II up to the dilution step. A slurry containing 150 grams of $Ca(OH)_2$ and 156 grams of $Al(OH)_3$ dispersed in 6000 cc. of water at 90° C. was added rapidly with stirring to the reacted calcium silicate solution. The yield of 840 grams indicates that the product is a mixture of the products of Examples III and X.

EXAMPLE XV 700 grams of wollastonite, 900 cc. of water, and 1200 cc. of 20° Baumé HCl were reacted as usual. A 3000 cc. slurry of 120 grams of $Mg(OH)_2$ at 90° C. was quickly added, followed immediately by the addition of another 3000 cc. slurry containing 156 grams of $Al(OH)_3$. The yield figures of 902 grams was higher than expected from a combination of Examples IV and X, the unctuous feel of the product indicated that a somewhat different product has been attained containing extra water of hydration.

Other modes of applying the principle of the invention may be employed, change being made as regards the details described, provided the features stated in any of the following claims or the equivalent of such be employed.

I therefore particularly point out and distinctly claim as my invention:

1. A process of the character described, comprising forming a fine silicious pigment by reacting on finely divided calcium silicate with a hydrochloric acid solution of molecular proportion to displace the calcium, and as the solution clears diluting it, in a period not over about 5 minutes, at a temperature around 90° C. with about two to two and a half times its volume of water containing a surface tension reducing agent and a plurality of hydroxides of the white hydroxide-forming metals of the group consisting of aluminum, magnesium, zinc, calcium, strontium and barium, while stirring vigorously, filtering, washing out chloride, and drying.

2. A process of the character described, comprising forming a fine silicious pigment by reacting on finely divided calcium silicate with a hydrochloric acid solution of molecular proportion to displace the calcium, and as the solution clears diluting it, in a period not over about 5 minutes at a temperature around 90° C. with about two to two and a half times its volume of water containing a plurality of hydroxides of the white hydroxide-forming metals of the group consisting of aluminum, magnesium, zinc, calcium, strontium and barium, while stirring vigorously, filtering, washing out chloride, and drying.

3. A process of the character described, comprising forming a fine compound pigment by dissolving finely divided calcium silicate in a solution of a mineral acid whose calcium salt is water-soluble, being selected from the class consisting of hydrochloric and nitric acids and being in molecular proportion to displace the calcium from said calcium silicate, and as the solution clears diluting it for a period not over about 5 minutes at a temperature around 90° C. with about two to two and a half times its volume of water containing a surface tension reducing agent and hydroxides of calcium and magnesium, while stirring vigorously, filtering, washing, and drying.

4. A process of the character described, comprising forming a fine compound pigment by dissolving finely divided calcium silicate in a solution of a mineral acid whose calcium salt is water-soluble, being selected from the class consisting of hydrochloric and nitric acids and being in molecular proportion to displace the calcium of said calcium silicate, and as the solution clears diluting it for a period not over about 5 minutes at a temperature around 90° C. with about two to two and a half times its volume of water containing hydroxides of calcium and magnesium, while stirring vigorously, filtering, washing, and drying.

5. A process of the character described, comprising forming a fine silicious pigment by reacting on finely divided calcium silicate with a hydrochloric acid solution of molecular proportion to displace the calcium, and as the solution clears diluting it in a period under twenty minutes, at a temperature around 90° C. with about two to two and a half times its volume of water containing a surface tension reducing agent and a hydroxide of the white hydroxide-forming metals of the group consisting of aluminum, magnesium, zinc, calcium, strontium and barium, while stirring vigorously, filtering, washing out chloride, and drying.

6. A process of the character described, comprising forming a fine compound pigment by dissolving finely divided calcium silicate in a solution of a mineral acid whose calcium salt is water-soluble, being selected from the class consisting of hydrochloric and nitric acids and being in molecular proportion to displace the calcium from said calcium silicate, and as the solution clears diluting it in a period under twenty minutes, at a temperature around 90° C. with about two to two and a half times its volume of water containing a surface tension reducing agent and a hydroxide of the white hydroxide-forming metals of the group consisting of aluminum, magnesium, zinc, calcium, strontium and barium, while stirring vigorously, filtering, washing and drying.

7. A process of the character described, comprising forming a fine silicious pigment by reacting on a mineral containing calcium silicate with a hydrochloric acid solution, and as the solution clears diluting it in a period under twenty minutes, at elevated temperature at least 80° C. with about two to two and a half times its volume of water containing a surface tension reducing agent and a hydroxide of the white hydroxide-forming metals of the group consisting of aluminum, magnesium, zinc, calcium, strontium and barium, while stirring vigorously, filtering, washing out chloride, and drying.

8. A process of the character described, comprising forming a fine compound pigment by dissolving a mineral containing calcium silicate in a solution of a mineral acid whose calcium salt is water-soluble, being selected from the class consisting of hydrochloric and nitric acids and being in molecular proportion to displace the calcium from said calcium silicate, and as the solution clears diluting it in a period under twenty minutes, at a temperature about 80° C. and in any case under boiling, with about two to two and a half times its volume of water containing a surface tension reducing agent and a hydroxide of the white hydroxide-forming metals of the group consisting of aluminum, magnesium, zinc, calcium, strontium and barium, while stirring vigorously, filtering, washing, and drying.

9. In a process of making pigments by precipitation, forming a silicious pigment in ultra-fine particles by diluting, at a temperature about 80° C. and in any case below boiling, a solution of calcium silicate in a mineral acid whose calcium salt is water-soluble, being selected from the class consisting of hydrochloric and nitric acids (the mineral acid being in molecular proportion to displace the calcium), with about two to two and a half times its volume of water containing calcium hydroxide, while stirring vigorously, and filtering.

10. In a process of making pigments by precipitation, forming a silicious pigment in ultra-fine particles by diluting, at a temperature about 80° C. and in any case below boiling, a solution of calcium silicate in a mineral acid whose calcium salt is water-soluble, being selected from the class consisting of hydrochloric and nitric acids (the mineral acid being in molecular proportion to displace the calcium), with about two to two and a half times its volume of water containing a surface tension reducing agent and a hydroxide of the white hydroxide-forming metals of the group consisting of aluminum, magnesium, zinc, calcium, strontium and barium, while stirring vigorously, and filtering.

11. In a process of making pigments by precipitation, forming a silicious pigment in ultra-fine particles, by diluting, at a temperature about 80° C. and in any case below boiling, a solution of calcium silicate in a mineral acid whose calcium salt is water-soluble, being selected from the class consisting of hydrochloric and nitric acids (the mineral acid being in molecular proportion to displace the calcium), with about two to two and a half times its volume of water containing a hydroxide of the white hydroxide-forming metals of the group consisting of aluminum, magnesium, zinc, calcium, strontium and barium, while stirring vigorously, and filtering.

12. In a process of making pigments by precipitation, forming a silicious pigment in ultra-fine particles, by diluting, at a temperature about 80° C. and in any case below boiling, a solution of calcium silicate in a mineral acid whose calcium salt is water-soluble, being selected from the class consisting of hydrochloric and nitric acids (the mineral acid being in molecular proportion to displace the calcium), with about two to two and a half times its volume of water containing a surface tension reducing agent and a plurality of hydroxides of the white hydroxide-forming metals of the group consisting of aluminum, magnesium, zinc, calcium, strontium and barium, while stirring vigorously, and filtering.

13. In a process of making pigments by precipitation, forming a silicious pigment in ultra-fine particles, by diluting, at a temperature about 80° C. in any case below boiling, a solution of calcium silicate in a mineral acid whose calcium salt is water-soluble, being selected from the class consisting of hydrochloric and nitric acids (the mineral acid being in molecular proportion to displace the calcium), with about two to two and a half times its volume of water containing a plurality of hydroxides of the white hydroxide-forming metals of the group consisting of aluminum, magnesium, zinc, calcium, barium and strontium, while stirring vigorously, and filtering.

14. In a process of making pigments by precipitation, forming a fine silicious pigment by adding to the water content of a mineral acid solution of calcium silicate (said acid being a mineral acid whose calcium salt is water-soluble, being selected from the class consisting of hydrochloric and nitric acids), by an amount at least two volumes of water and in a period not over twenty minutes at a temperature about 80° C. and in any case below boiling, while stirring vigorously, and filtering.

15. As a new pigment-type product, a fine compound-precipitate of hydrated silica and hydrates of calcium and magnesium in proportion of 1–3 moles of the latter to 3 moles of the former, in particle size under one hundred microns, and bulk density under fifteen pounds per cubic foot.

16. As a new pigment-type product, a fine compound-precipitate of hydrated silica and two hydroxides of the white hydroxide-forming metals of the group consisting of aluminum, magnesium, zinc, calcium, strontium and barium, in proportion of 1-3 moles of the latter to 3 moles of the former, in particle size under one hundred microns, and bulk density under fifteen pounds per cubic foot.

17. As a new pigment-type product, a fine compound-precipitate of hydrated silica with a plurality of hydroxides of the white hydroxide-forming metals of the group consisting of aluminum, magnesium, zinc, calcium, strontium and barium, in proportion of 1-3 moles of the latter to 3 moles of the former, in particle size under one hundred microns, and bulk density under fifteen pounds per cubic foot.

18. As a new pigment-type product, a fine compound-precipitate of hydrated silica and a hydroxide of calcium, in proportion of 1-3 moles of the latter to 3 moles of the former, in particle size under one hundred microns, and bulk density under fifteen pounds per cubic foot.

19. As a new pigment-type product, a fine compound-precipitate of hydrated silica and a hydroxide of the white hydroxide-forming metals of the group consisting of aluminum, magnesium, zinc, calcium, strontium and barium, in proportion of 1-3 moles of the latter to 3 moles of the former, in particle size under one hundred microns, and bulk density under fifteen pounds per cubic foot.

References Cited in the file of this patent

UNITED STATES PATENTS

| Number | Name | Date |
| --- | --- | --- |
| 1,715,439 | Van Nes | June 4, 1929 |
| 2,237,374 | Smith | Apr. 8, 1941 |
| 2,259,482 | Mowlds | Oct. 21, 1941 |
| 2,314,188 | Allen | Mar. 16, 1943 |
| 2,532,497 | Hoekstra | Dec. 5, 1950 |